(12) United States Patent
Huang et al.

(10) Patent No.: US 9,280,243 B2
(45) Date of Patent: Mar. 8, 2016

(54) SENSING METHOD USING SELF-CAPACITANCE AND MUTUAL-CAPACITANCE ALTERNATIVELY TO REDUCE TOUCH NOISES

(71) Applicant: Orise Technology Co., Ltd, Hsinchu (TW)

(72) Inventors: Hsin-Mao Huang, Hsinchu (TW); Hsiang Cheng Yu, Hsinchu (TW); Chih-Hung Kung, Miaoli County (TW); Shih-Hsin Huang, Taoyuan County (TW)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 52 days.

(21) Appl. No.: 14/162,056

(22) Filed: Jan. 23, 2014

(65) Prior Publication Data
US 2014/0204058 A1    Jul. 24, 2014

(30) Foreign Application Priority Data

Jan. 24, 2013 (TW) .............................. 102102626 A

(51) Int. Cl.
*G06F 3/044* (2006.01)
*G06F 3/041* (2006.01)
(52) U.S. Cl.
CPC .............. *G06F 3/044* (2013.01); *G06F 3/0418* (2013.01)

(58) Field of Classification Search
USPC .................................................. 345/173–175
See application file for complete search history.

(56) References Cited

U.S. PATENT DOCUMENTS

| 7,919,367 | B2 | 4/2011 | Fang et al. | |
| 8,816,985 | B1* | 8/2014 | Tate | G06F 3/041 345/173 |
| 2012/0075243 | A1* | 3/2012 | Doi et al. | 345/174 |
| 2013/0154996 | A1* | 6/2013 | Trend et al. | 345/174 |
| 2014/0240280 | A1* | 8/2014 | Ekici | G06F 3/044 345/174 |
| 2014/0368460 | A1* | 12/2014 | Mo | G06F 3/044 345/174 |

* cited by examiner

*Primary Examiner* — Grant Sitta
(74) *Attorney, Agent, or Firm* — Bacon & Thomas, PLLC

(57) ABSTRACT

In a sensing method using self-capacitance and mutual-capacitance alternatively to reduce touch noises, a control device configures a first driving and sensing device and a second driving and sensing device to perform an initialization. The control device configures the first and second driving and sensing devices to perform at least one self-capacitance sensing for producing a first possible touch point range during a first work mode. Then, the control device configures the first and second driving and sensing devices to perform at least one mutual-capacitance sensing for producing a second possible touch point range during a second work mode. The control device determines if there is range conjunction between the first and second possible touch point ranges. The control device produces a possible touch point range conjunction and calculates coordinates of touch points based on the possible touch point range conjunction.

12 Claims, 13 Drawing Sheets

SENSING METHOD USING SELF-CAPACITANCE AND MUTUAL-CAPACITANCE ALTERNATIVELY TO REDUCE TOUCH NOISES

BACKGROUND OF THE INVENTION

1. Field of the Invention

The present invention relates to the technical field of touch panels and, more particularly, to a sensing method using self-capacitance and mutual-capacitance alternatively to reduce touch noises.

2. Description of Related Art

The principle of touch panels is based on different sensing manners to detect a voltage, current, acoustic wave, or infrared to thereby detect the coordinate of a touch point on a screen as touched by a finger or other medium. For example, a resistive touch panel uses a potential difference between the upper and lower electrodes to compute the position of a pressed point for detecting the location of the touch point, and a capacitive touch panel uses a capacitance change generated in an electrostatic combination of the arranged transparent electrodes with the touching part of a human body to generate a current or voltage for detecting the coordinate of the touching part.

A typical capacitive touch system uses a sensor circuit to measure a capacitance change of a touch panel to thereby obtain the information of the touched positions and the like, so as to compute the coordinates of the touched positions. However, in the process of fetching touch data, due to noise interferences on the capacitive sensor circuit, touchpad unit, and even driver circuit, an external noise to ground interference, or internal noise interferences generated in the ICs, the touch data may be distorted and drifted, resulting in that noisy spots are presented, as shown in FIG. 1, or real touch point is disappeared or coordinate is shifted.

A typical projected capacitive touch sensing can be divided into self-capacitance sensing and mutual-capacitance sensing. The self-capacitance sensing indicates that a coupled capacitance is generated between a touch object and a conductor line, and a touch occurrence is decided by measuring a capacitance change of the conductor line. By contrast, the mutual-capacitance sensing indicates that a coupled capacitance is generated between two adjacent conductor lines when a touch occurs.

The self-capacitance sensing senses a grounded capacitance on each conductor line. Thus, a change of the grounded capacitance is used to determine whether an object is approached to the capacitive touch panel. The self-capacitance or the grounded capacitance is not a physical capacitor, but a parasitic and stray capacitance on each conductor line.

The mutual-capacitance sensing senses a magnitude change of a mutual-capacitance Cm to thereby determine whether an object is approached to the touch panel. Likewise, the mutual-capacitance is not a physical capacitor but a mutual-capacitance between a driving conductor line and a sensing conductor line.

The self-capacitance sensing may easily cause one or more ghost points, but the correct relative positions still can be detected. FIG. 2 schematically illustrates the ghost points of the self-capacitance sensing.

In this case, the self-capacitance sensing generates two ghost points, but the correct touch points on X and Y axes can be indicated. Namely, even the real touch points cannot be recognized, it needs only to separate two touch points from the four points in FIG. 2.

The mutual-capacitance sensing uses the driving signals at different time to simply detect the correct positions of the two touch points. FIG. 3 is a schematic diagram of the typical mutual-capacitance sensing. As shown in FIG. 3, the driving signals are outputted at different time such that the correct positions of each touch point can be found through the time differences.

However, when there are external noises or the panel receives noises, it is found that the mutual-capacitance sensing is sensitive to the noise interference on the same sensing line. Because the touch system is connected to the real ground system, the touch system can steadily and accurately output the coordinates of the touch points due to the touch media (such as a user's finger) being also connected to the real earth's ground system. However, when the touch system uses an independent power, which is connected to ground that is different from the real earth ground, this may cause the coordinates of the touch points to greatly shake or generate other noisy spots, so that the steady touch system is negatively affected, as shown in FIG. 4.

FIG. 5 schematically illustrates a model of the mutual-capacitance sensing, wherein the capacitance Cd indicates a parasitic and stray capacitance on a driving conductor line, the capacitance Cs indicates a parasitic and stray capacitance on a sensing conductor line, the capacitance Cm indicates a mutual-capacitance between the driving conductor line and the sensing conductor line, and the capacitance Cf2 indicates a capacitance obtained when a finger touches the panel.

As shown in FIG. 5, based on a change of the capacitance Cm, it is determined whether the panel is touched by the finger. Due to the mutual-capacitance Cm, which is a very small capacitance about 0.7 pF, a great amount of impedance is presented when a driving signal is inputted to the driving conductor line D1. If a finger touches, a noise is introduced via the finger, and the amplitude of the driving signal is relatively small due to the capacitance Cm with respect to an integrator. Thus, the output signal of the integrator is greatly influenced by the noise.

FIG. 6 schematically illustrates a model of the self-capacitance sensing, wherein the capacitance Cf indicates a capacitance obtained when a finger touches the panel, and the capacitance Cx indicates a capacitance on a grounded conductor line. The capacitance Cx is relatively greater than the capacitance Cm, such that the driving signal charges and discharges a large capacitance Cx. Thus, the noise affection to the self-capacitance sensing is smaller than the mutual-capacitance sensing.

To improve this, a filter circuit is typically used to filter external noises other than the driving signal so as to reduce the noise affection thereby steadily outputting the coordinates. Generally, the filter circuit is added before or after the integrator, as shown in FIG. 7. The filter circuit can be a low-pass, high-pass, or band-reject anti-noise circuit.

The filter circuit can be a combination of resistors and capacitors, i.e., a passive filter circuit, which can work well in a simple circuit system. However, for the passive filter circuit in a touch system, its solution is different because different factories have different designs on the passive filter circuit. Also, difficulties are presented on a slight capacitance change and smaller input voltage with respect to other circuits. The cited conditions are disadvantageous to noise cancellation. The filter circuit has a good effect on a number of expectable noises or skippable noise rates. However, for a small signal which is sensitive to noises, a slight noise can cause an incorrect data determination, or even the original small signal is filtered out. Thus, for the touch system, the use of filter circuit is not satisfactory.

To overcome this, some touch IC design factories increases the voltage of a driving signal to cope with the noise interference. However, such a way increases the power consumption and is not suitable for handheld devices. In addition, the circuit before the integrator is affected by noises which are difficult to be canceled, even the voltage of the driving signal is enlarged.

Another typical method adjusts the threshold to determine whether there is a touch point. FIG. 8 is a schematic diagram of adjusting a noise threshold in the prior art. The capacitive touch system uses tiny capacitance change to determine whether one or more touch points are presented. To avoid the touch points generated by an error determination due to the noise interference, the noise threshold is adjusted up or down to meet with the environment change. As shown in FIG. 8, the noise threshold in Design A is too lower, and thus it is adjusted up in Design B.

However, it is not easy to implement the adjustable noise threshold because the touch IC cannot clearly know the noise source. In addition, for adjusting the noise threshold with different conditions, the system has to be re-initialized to thereby adjust the parameters and obtain the best noise threshold. Accordingly, the system resources are relatively consumed.

In U.S. Pat. No. 7,719,367 granted to Krah for a "Automatic frequency calibration", a frequency conversion driving way is employed to avoid the noise interference from different bands. As shown in FIG. 9, a driving signal is applied with three frequencies to scan the touch panel. For most noises, this is a good way to avoid the noises. In addition, the data with the three frequencies can be compared so as to increase the accuracy on subsequently processing the coordinates of touch points. However, since the noise source is not clear, such a way cannot avoid all noise frequencies. Furthermore, the three-frequency driving signal inevitably uses more system resources, resulting in reducing the report rate of the touch points and consuming more power.

Therefore, it is desirable to provide an improved sensing method for a capacitive touch panel to mitigate and/or obviate the aforementioned problems.

SUMMARY OF THE INVENTION

The object of the present invention is to provide a sensing method using self-capacitance and mutual-capacitance alternatively to reduce touch noises, which can be applied in handheld devices to reduce noises on touched positions and increase the accuracy.

To achieve the object, the present invention provides a sensing method using self-capacitance and mutual-capacitance alternatively to reduce touch noises in a capacitive multi-touch system including a capacitive touch panel, a first driving and sensing device, a second driving and sensing device, and a control device. Each of the first driving and sensing device and the second driving and sensing device has a first work mode and a second work mode. When the first driving and sensing device and the second driving and sensing device are at the first work mode, a self-capacitance sensing is performed. When the first driving and sensing device and the second driving and sensing device are at the second work mode, a mutual-capacitance sensing is performed. The sensing method includes the steps of: (A) initializing the first driving and sensing device and the second driving and sensing device; (B) respectively configuring the first driving and sensing device and the second driving and sensing device as the first work mode or the second work mode to perform the self-capacitance sensing or the mutual-capacitance sensing on the capacitive touch panel for finding a first possible touch point range or a second possible touch point range; (C) determining whether there is a range conjunction between the first possible touch point range and the second possible touch point range; and (D) producing a possible touch point range conjunction when there is the range conjunction, and calculating coordinates of touch points based on the possible touch point range conjunction.

Other objects, advantages, and novel features of the invention will become more apparent from the following detailed description when taken in range conjunction with the accompanying drawings.

DETAILED DESCRIPTION OF THE PREFERRED EMBODIMENT

Figure 1:
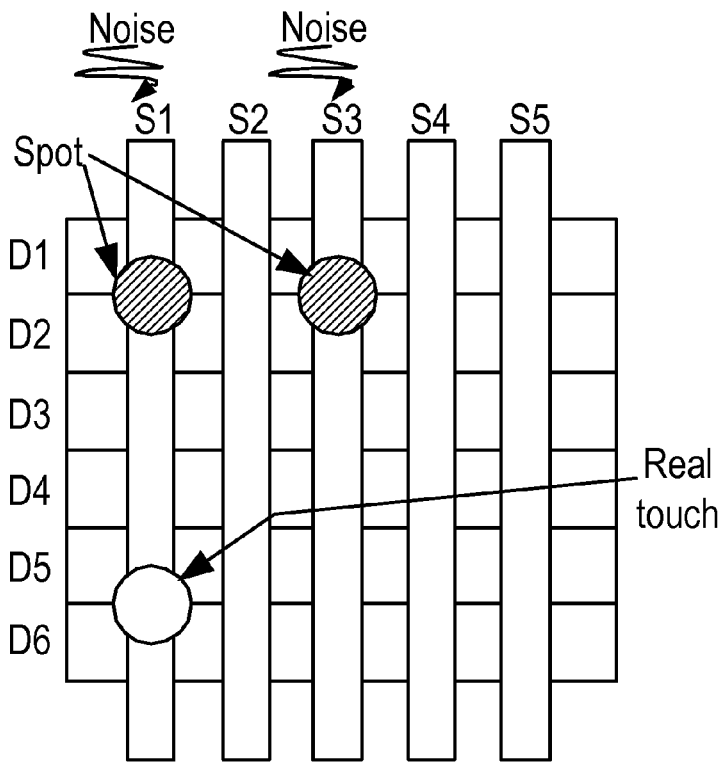
FIG. 1 is a schematic diagram of spots in a typical capacitive touch system.
Figure 2:
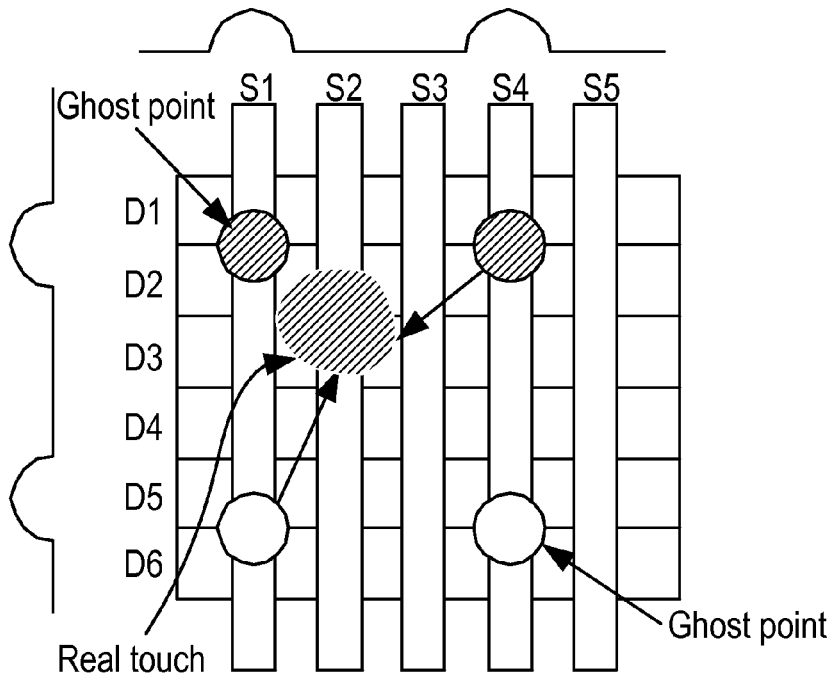
FIG. 2 is a schematic diagram of a typical self-capacitance sensing and ghost points.
Figure 3:
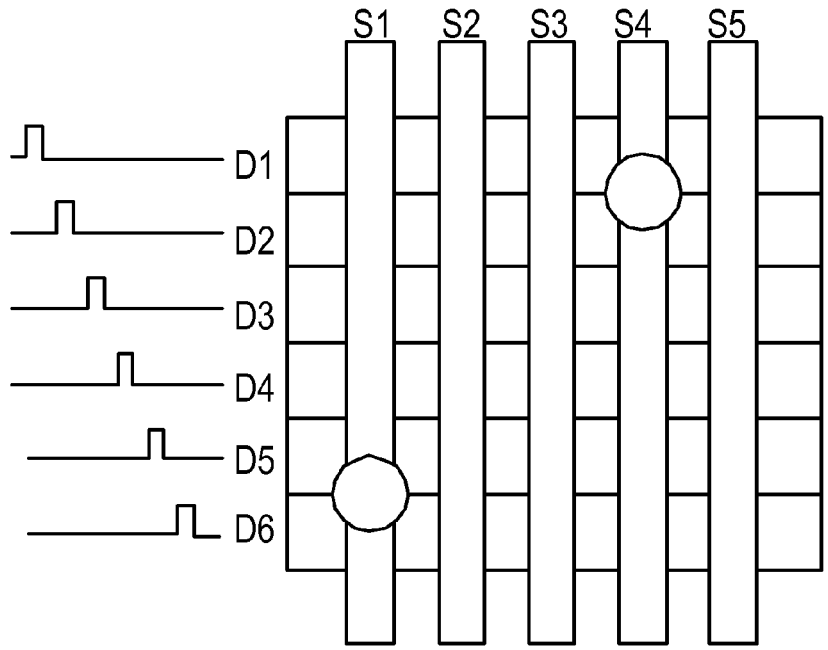
FIG. 3 is a schematic diagram of a typical mutual-capacitance sensing.
Figure 4:
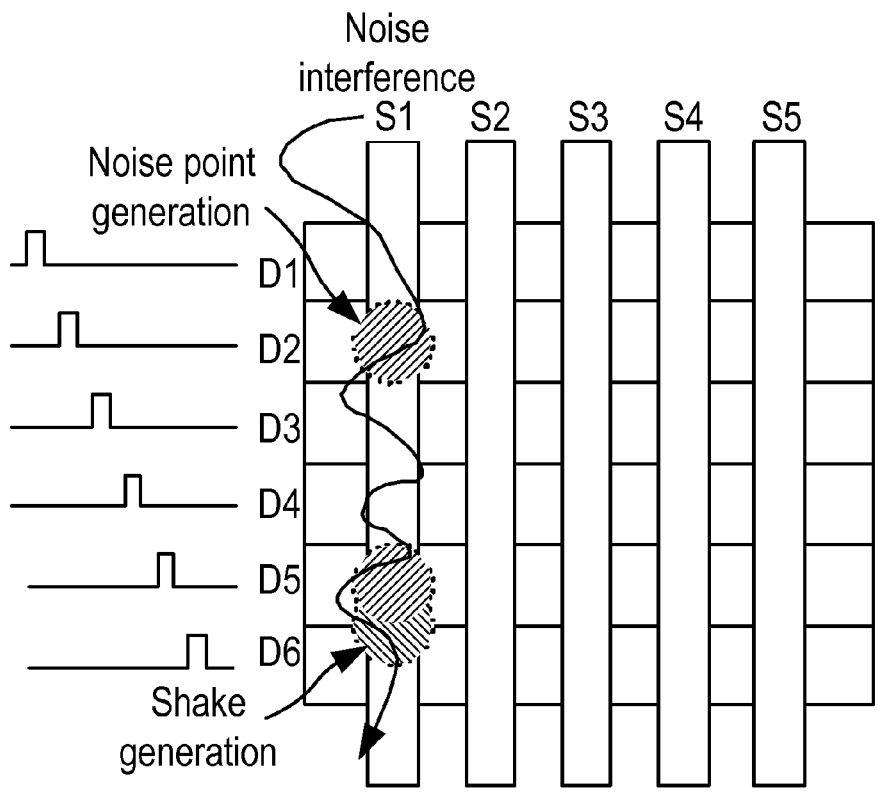
FIG. 4 is a schematic diagram of a typical mutual-capacitance sensing affected by noises.
Figure 5:
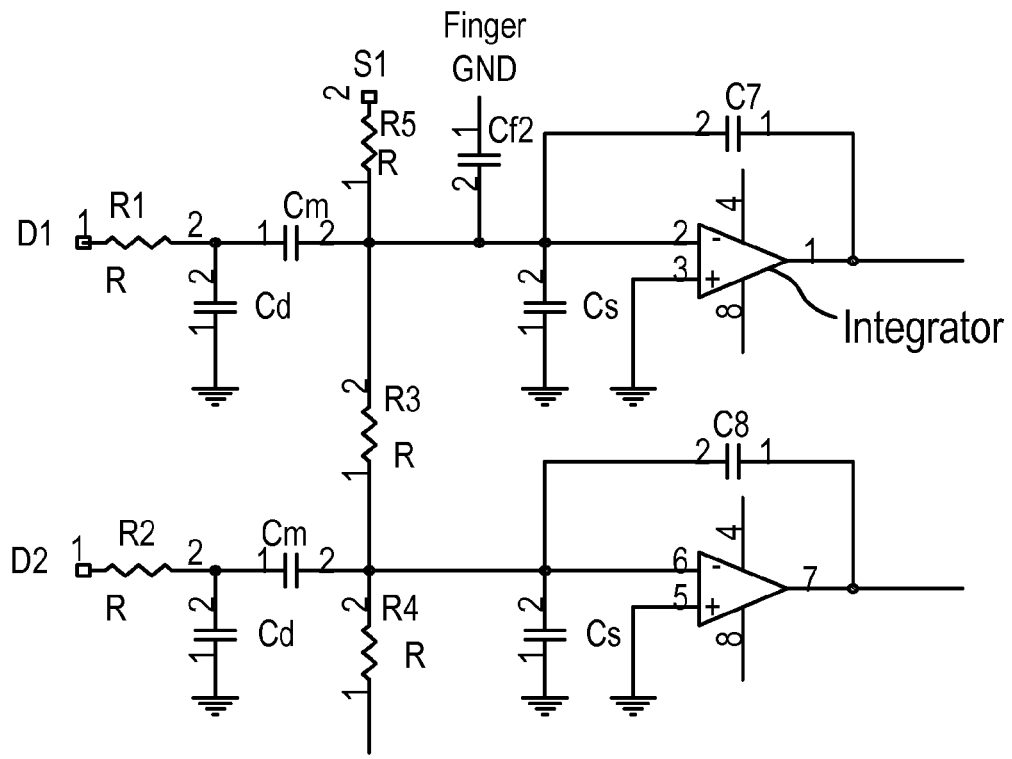
FIG. 5 is a schematic diagram of a model of a typical mutual-capacitance sensing.
Figure 6:
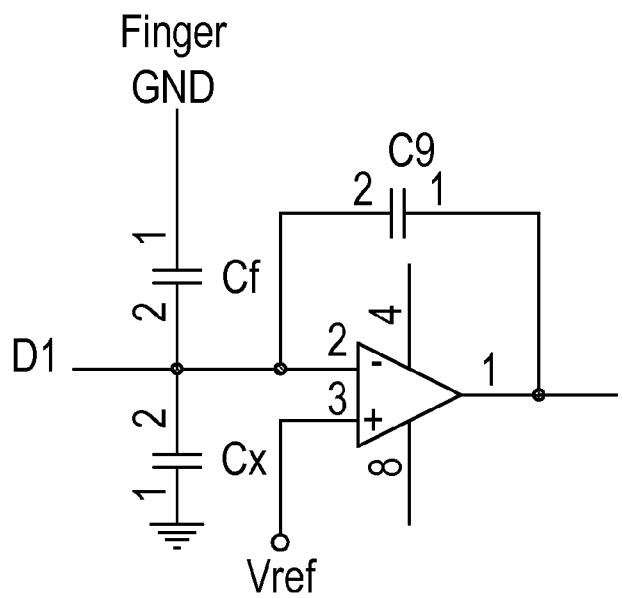
FIG. 6 is a schematic diagram of a model of a typical self-capacitance sensing.
Figure 7:
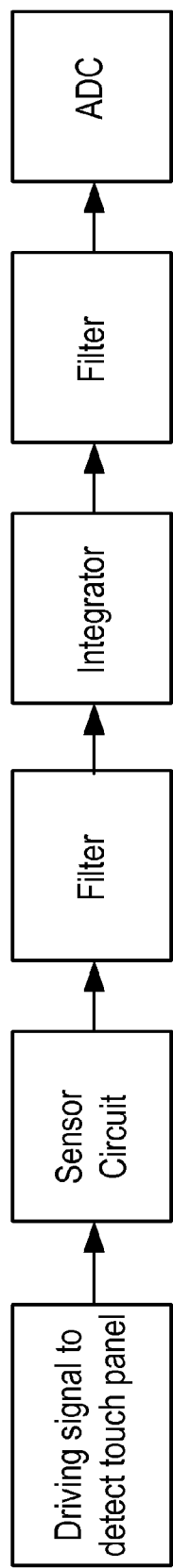
FIG. 7 is a schematic diagram of a typical capacitive touch system using a filter circuit.
Figure 8:
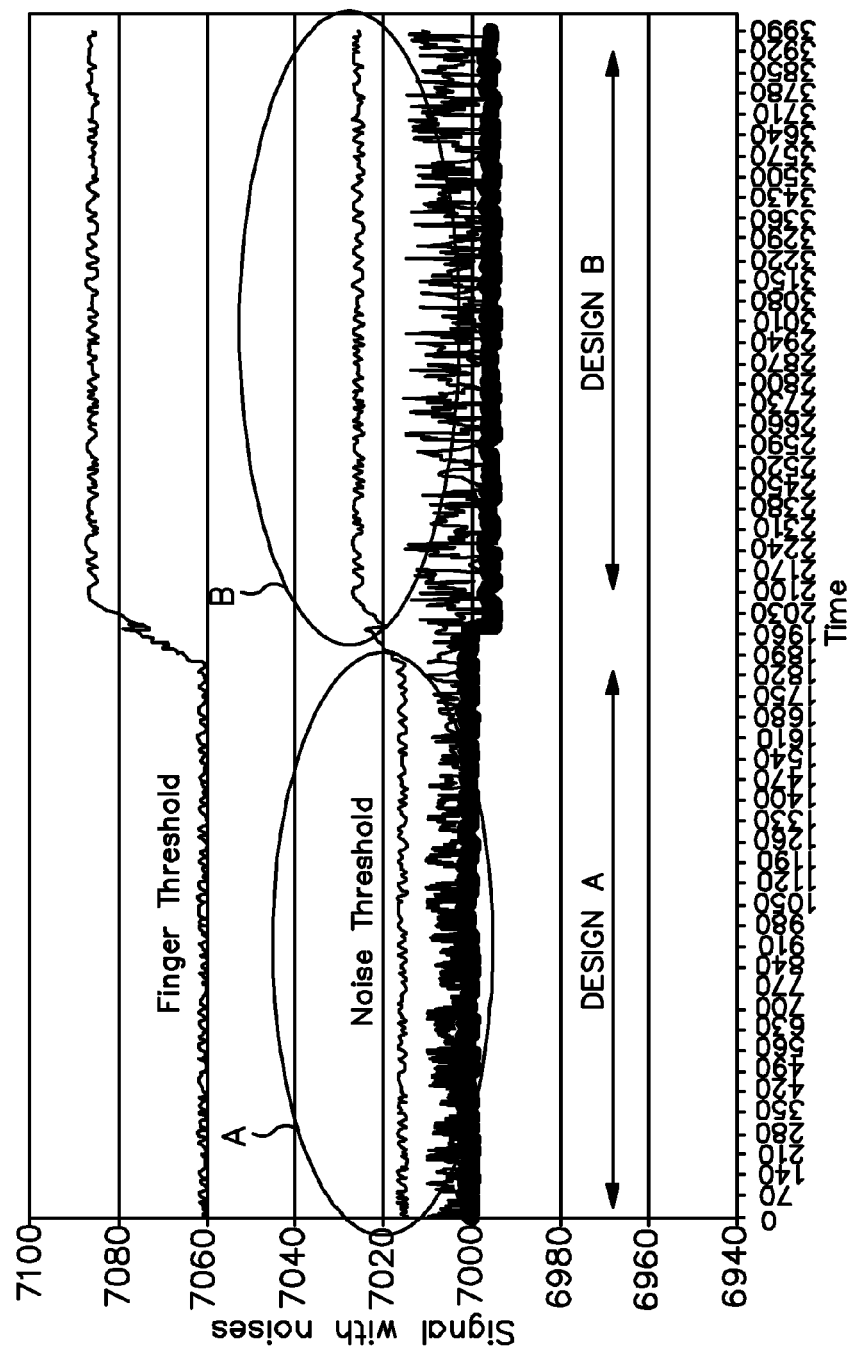
FIG. 8 is a schematic diagram of adjusting a noise threshold.
Figure 9:
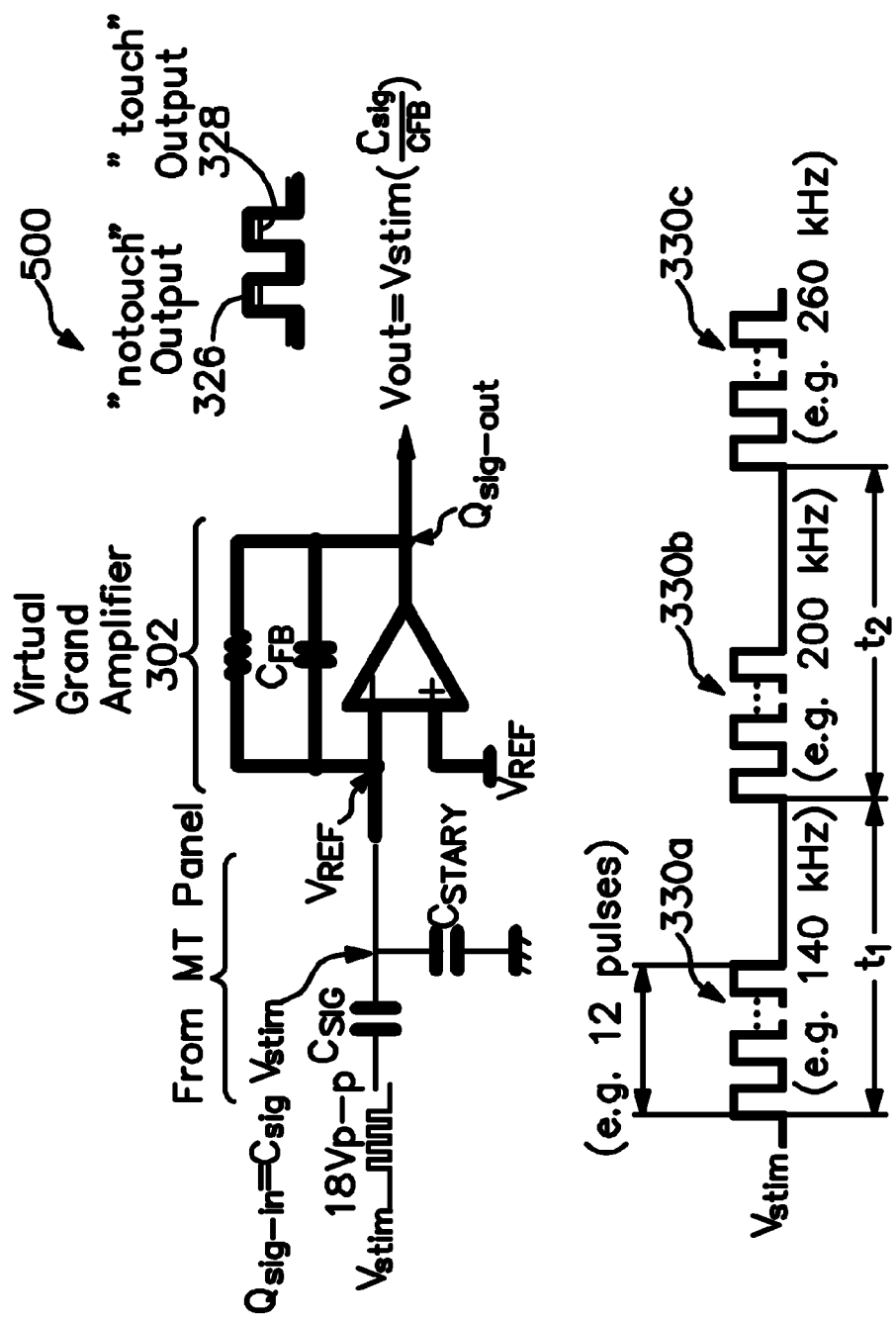
FIG. 9 is a schematic diagram of a driving signal using three frequencies to scan a touch panel.
Figure 10:
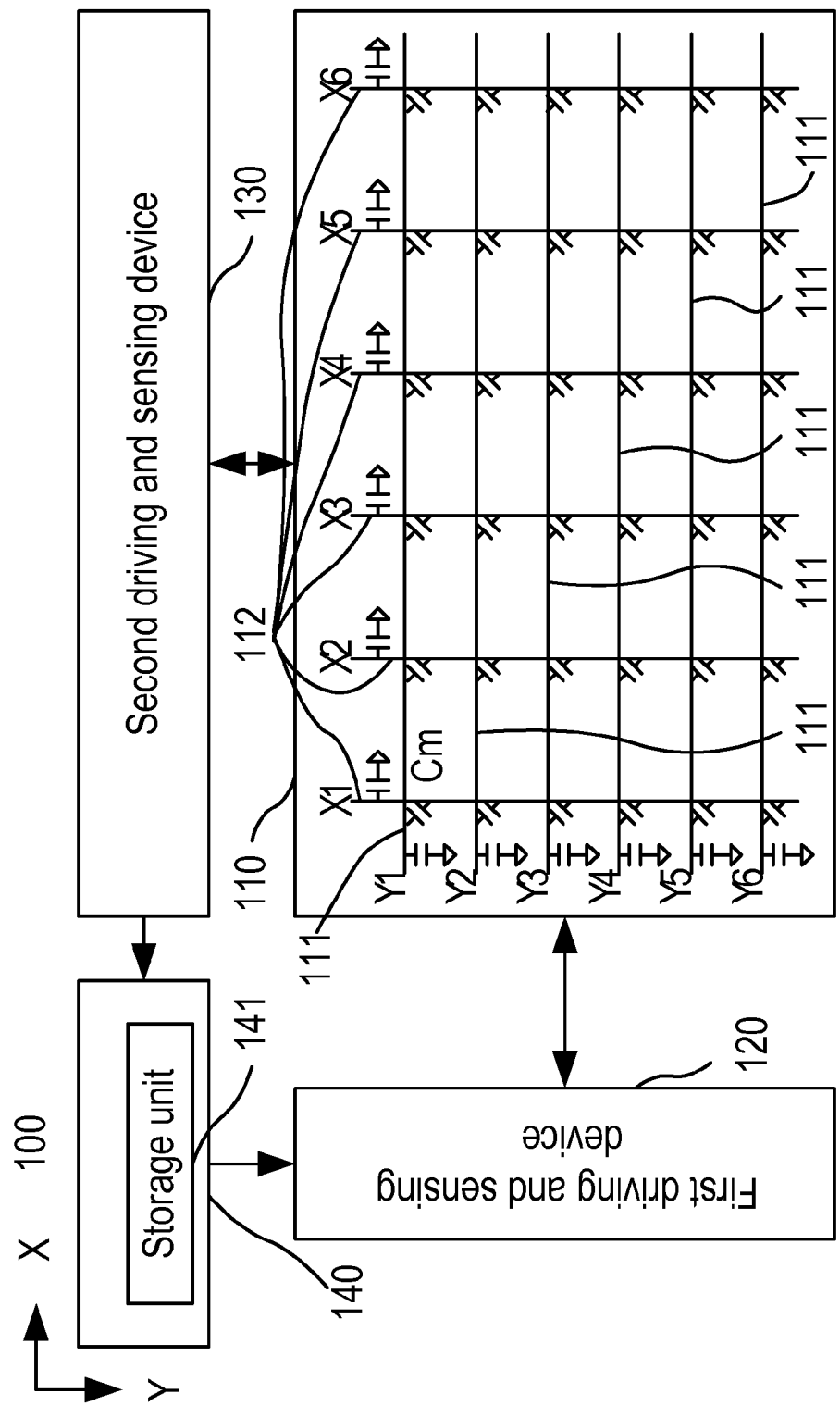
FIG. 10 is a block diagram of a capacitive multi-touch system according to the invention.
Figure 11:
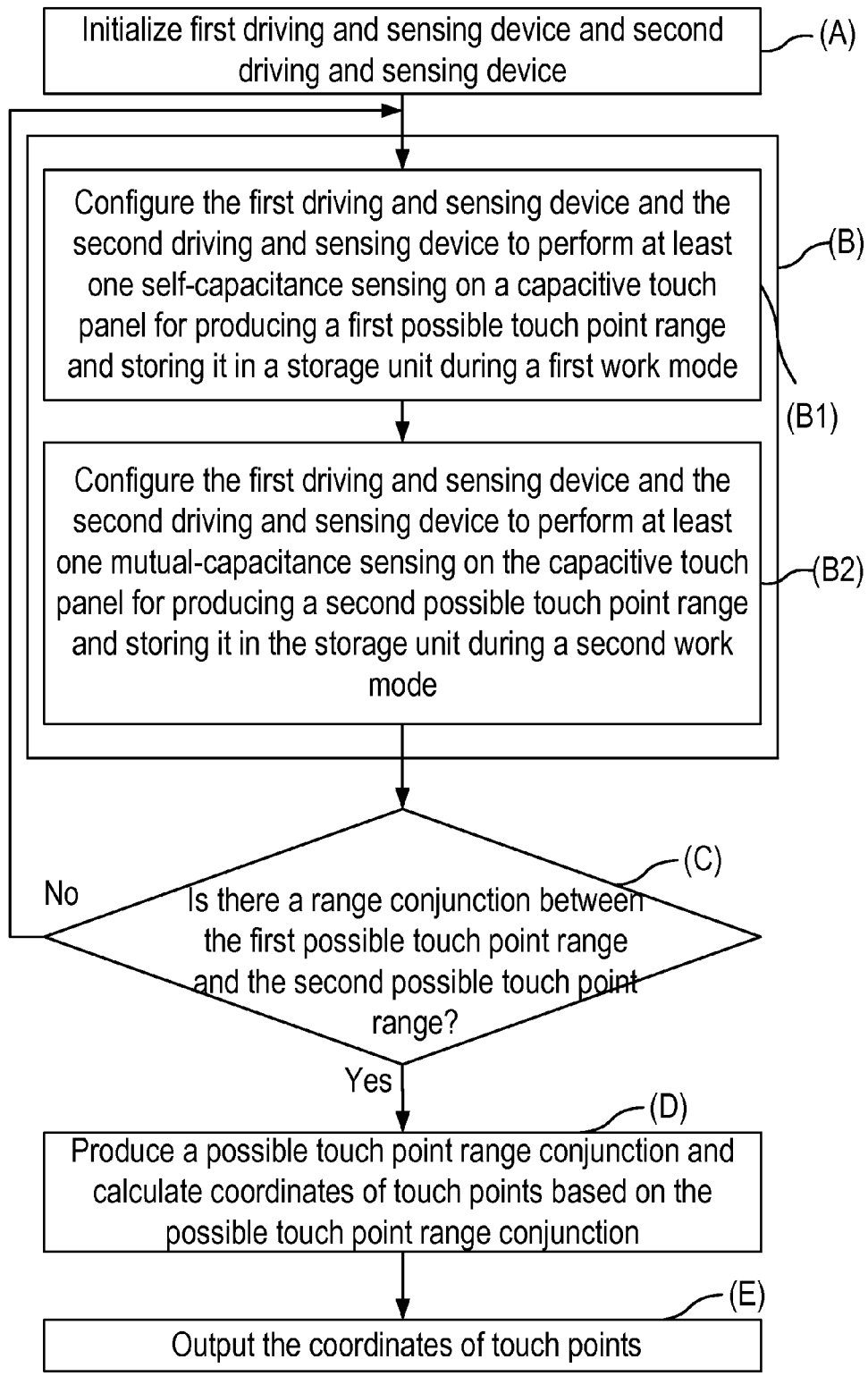
FIG. 11 is a flowchart of a sensing method using self-capacitance and mutual-capacitance alternatively to reduce touch noises according to the invention.

The invention provides a sensing method using self-capacitance and mutual-capacitance alternatively to reduce touch noises in a capacitive multi-touch system. FIG. 10 is a block diagram of the capacitive multi-touch system 100 according to the invention. FIG. 11 is a flowchart of the sensing method using self-capacitance and mutual-capacitance alternatively to reduce touch noises according to the invention. As shown in FIG. 10, the capacitive multi-touch system 100 includes a capacitive touch panel 110, a first driving and sensing device 120, a second driving and sensing device 130, and a control device 140.

The capacitive touch panel 110 has m first conductor lines 112 distributed in a first direction (X-axis direction) and n second conductor lines 111 distributed in a second direction (Y-axis direction), wherein m and n are each an integer greater than one, and the first direction is vertical to the second direction.

Each of the first driving and sensing device 120 and the second driving and sensing device 130 has a first work mode and a second work mode. When the first driving and sensing device 120 and the second driving and sensing device 130 operate at the first work mode, a self-capacitance sensing is performed. When the first driving and sensing device 120 and the second driving and sensing device 130 operate at the second work mode, a mutual-capacitance sensing is performed. The control device has a storage unit 141.

With reference to the flowchart of FIG. 11, the control device 140 configures the first driving and sensing device 120 and the second driving and sensing device 130 to perform an initialization in step (A).

In step (B), the first driving and sensing device 120 and the second driving and sensing device 130 are configured as the first work mode or the second work mode in order to perform the self-capacitance sensing or the mutual-capacitance sensing on the capacitive touch panel for finding a first possible touch point range or a second possible touch point range and storing it in the storage unit 141.

Figure 12:
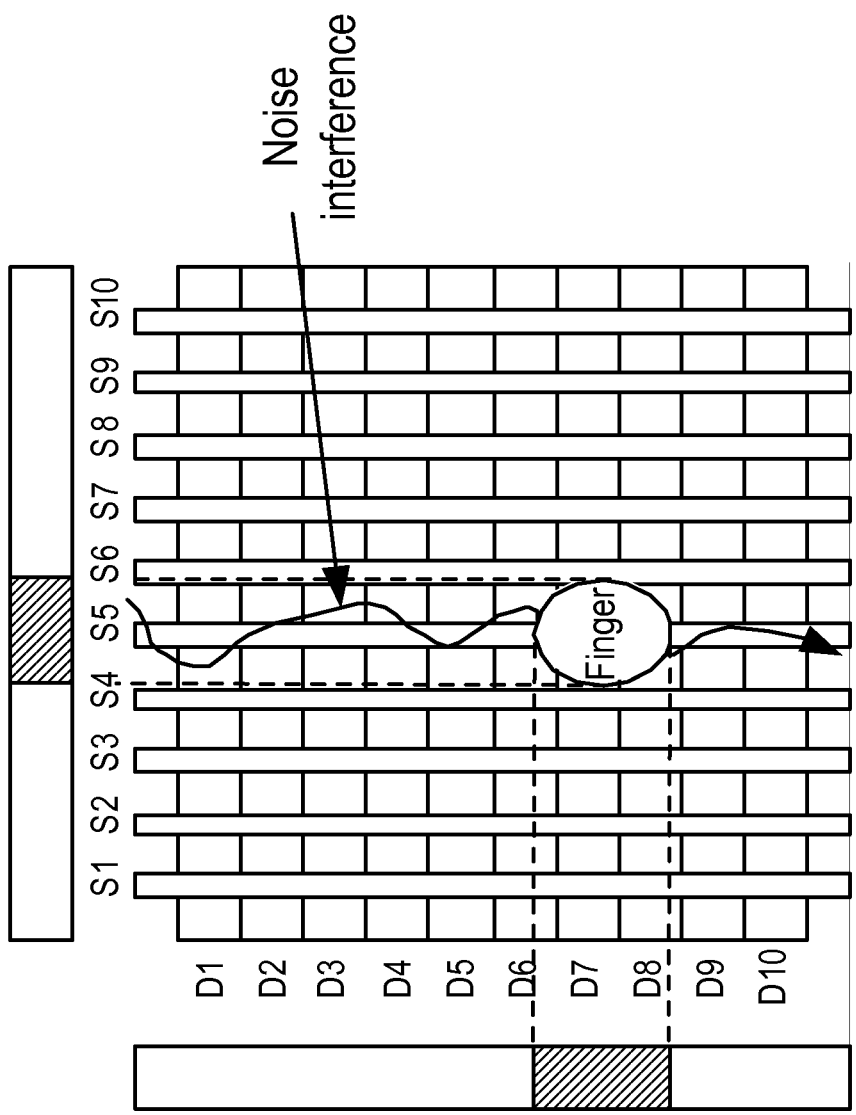
FIG. 12 is a schematic diagram of a self-capacitance sensing according to the invention.

Step (B) is divided into steps (B1) and (B2). In step (B1), the control device 140 configures the first driving and sensing device 120 and the second driving and sensing device 130 as the first work mode in order to perform at least one self-capacitance sensing on the capacitive touch panel 110 for finding a first possible touch point range and storing it in the storage unit 141 during the first work mode. FIG. 12 shows a schematic diagram of the self-capacitance sensing according to the invention.

Furthermore, step (B1) uses the self-capacitance sensing to detect the first possible touch point range on the capacitive touch panel 110. At least one average result or at least one available result in step (B1) can be used as the first possible touch point range. The self-capacitance sensing can be performed before or after the mutual-capacitance sensing, or in each different step to help the noise elimination and retain the real touch points.

Step (B1) performs at least one self-capacitance sensing to produce a self-capacitance image raw data, such that the control device 140 can determine whether the self-capacitance image raw data is greater than a first threshold Th1 so as to find the first possible touch point range. When the self-capacitance image raw data is not greater than the first threshold Th1, the control device 140 indicates that there is touch point, so to obtain the first possible touch point range. Since the self-capacitance sensing is used, the amount of the self-capacitance image raw data is m+n records, where m and n are each an integer greater than one.

As shown in FIG. 12, the first possible touch point range can be {(D6,S4), (D6,S5), (D6,S6), (D7,S4), (D7,S5), (D7, S6), (D8,S4), (D8,S5), (D8,S6)}.

Figure 13:
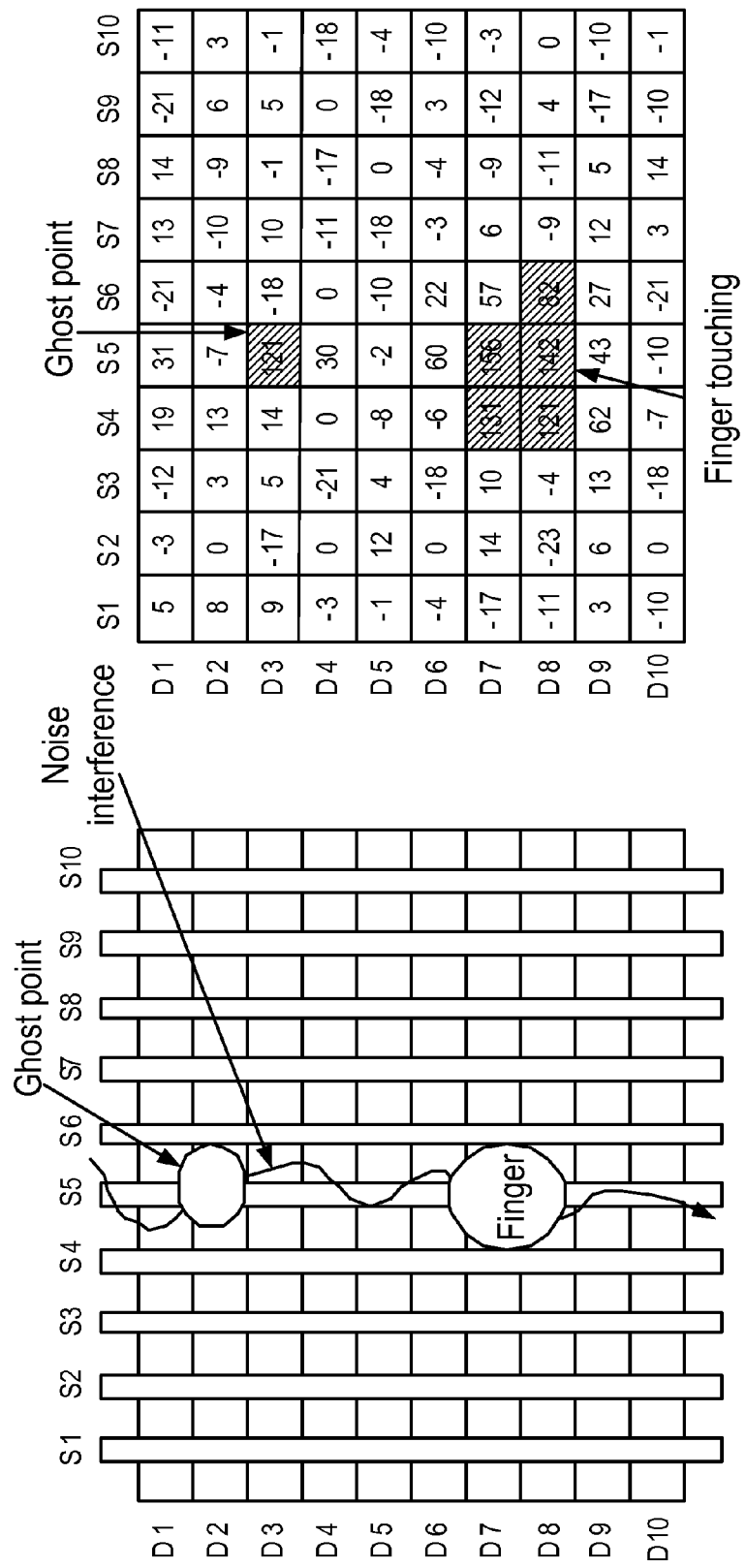
FIG. 13 is a schematic diagram of a mutual-capacitance sensing according to the invention.

In step (B2), the control device 140 configures the first driving and sensing device 120 and the second driving and sensing device 130 as the second work mode in order to perform at least one mutual-capacitance sensing on the capacitive touch panel 110 for finding a second possible touch point range and then storing it in the storage unit 141 during a second work mode. FIG. 13 is a schematic diagram of the mutual-capacitance sensing according to the invention.

Furthermore, step (B2) uses the mutual-capacitance sensing to detect the second possible touch point range on the capacitive touch panel 110. At least one average result or at least one available result in step (B2) can be used as the touch point data. The mutual-capacitance sensing can be performed before or after the self-capacitance sensing, or in each different step to help the step of subsequent coordinate output.

Step (B2) performs at least one mutual-capacitance sensing to produce a mutual-capacitance image raw data, such that the control device 140 can determine whether the mutual-capacitance image raw data is greater than a second threshold Th2 so as to find the second possible touch point range. When the mutual-capacitance image raw data is greater than the second threshold Th2, the control device 140 indicates that there is touch point, so as to obtain the first possible touch point range. Since the mutual-capacitance sensing is used, the amount of the mutual-capacitance image raw data is m*n, where m and n are each an integer greater than one.

As shown in FIG. 13, the second possible touch point range can be {(D3,S5), (D7,S4), (D7,S5), (D8,S4), (D8,S5), (D8, S6)}.

Step (C) determines whether there is a range conjunction between the first possible touch point range and the second possible touch point range.

In step (C), the distances between the elements of the first possible touch point range and the second possible touch point range are computed to thereby obtain a possible touch point range conjunction. Namely, the distances between the elements of the first possible touch point range and the elements of the second possible touch point range are sequentially computed to determine whether there is at least zero. When there is zero, it indicates that the elements of the first possible touch point range are contained in the second possible touch point range. In this case, the elements of the first possible touch point range are the elements of the possible touch point range conjunction.

When there is no zero, it indicates that the elements of the first possible touch point range are not contained in the second possible touch point range. In this case, the elements of the first possible touch point range are not the elements of the possible touch point range conjunction.

For example, the distance between the element (D6,S4) of the first possible touch point range and one of the elements {(D3,S5), (D7,S4), (D7,S5), (D8,S4), (D8,S5), (D8,S6)} of the second possible touch point range is greater than zero, so that the element (D6,S4) is not contained in the possible touch point range conjunction. The distance between the element (D7,S4) of the first possible touch point range and the element (D7,S4) of the second possible touch point range is zero, so that the element (D7,S4) of the first possible touch point range is an element of the possible touch point range conjunction.

As cited, the above description is based on the element of the first touch point range to compute the distance between the element of the first touch point range and each element of the second possible touch point range, so as to determine whether the element of the first touch point range is an element of the possible touch point range conjunction. Alternatively, the computation can be performed based on an element of the second possible touch point range to determine whether the element of the second possible touch point range is an element of the possible touch point range conjunction. For example, the distance between an element (D3, S5) of the second possible touch point range and one of the elements {(D6,S4), (D6,S5), (D6,S6), (D7,S4), (D7,S5), (D7,S6), (D8, S4), (D8,S5), (D8,S6)} of the first possible touch point range is greater than zero, so that the element (D3, S5) is not an element of the possible touch point range conjunction.

To determine coordinates of touch points more accurately, the computation can be performed based on each element of the first possible touch point range first and then on each element of the second possible touch point range, so as to obtain the possible touch point range conjunction.

When step (C) determines that there is a range conjunction, step (D) produces the possible touch point range conjunction and calculates coordinates of touch points based on the possible touch point range conjunction.

Figure 14:
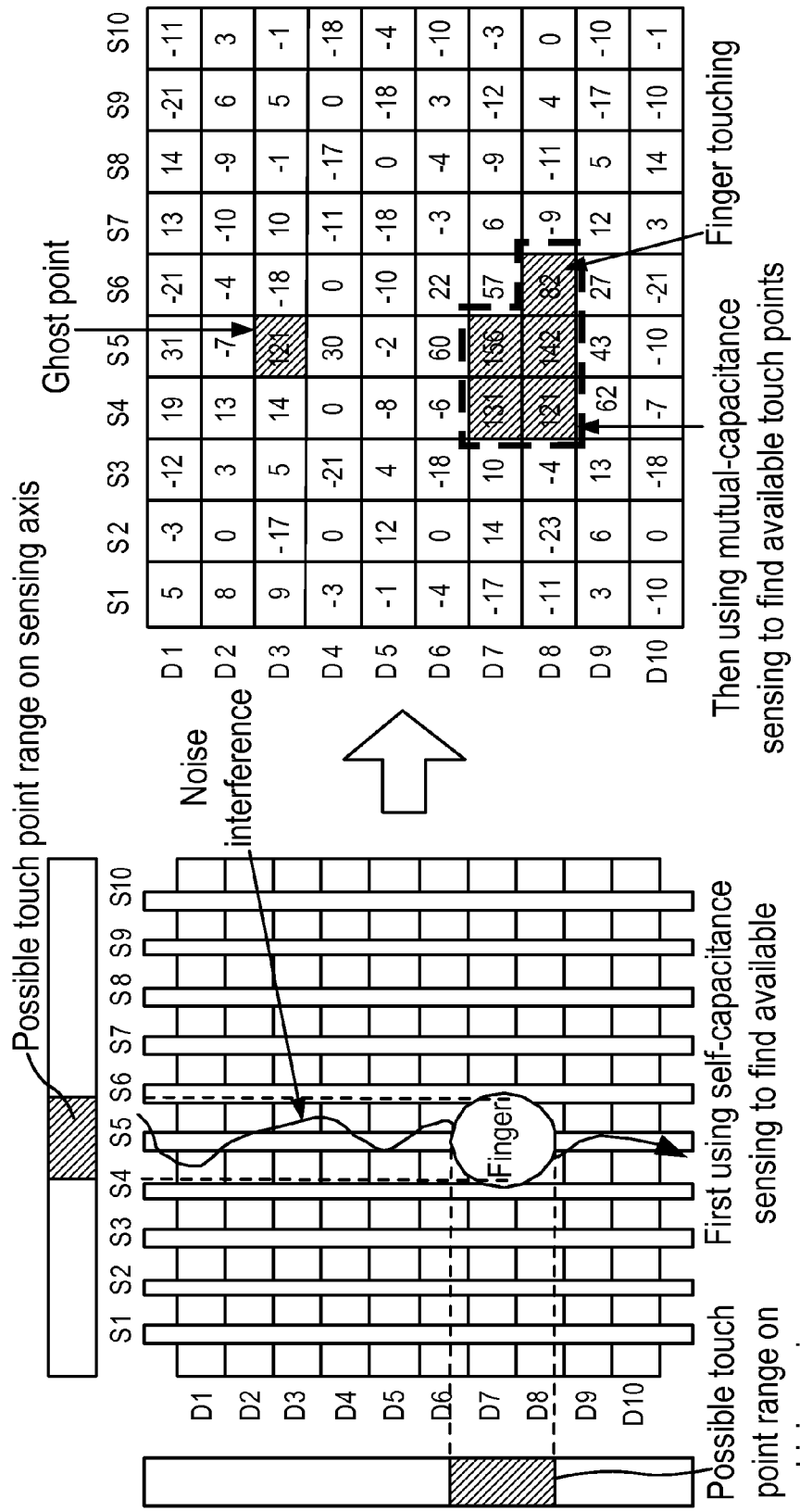
FIG. 14 is a schematic diagram of generating a possible touch point range conjunction according to the invention.

FIG. 14 is a schematic diagram of generating a possible touch point range conjunction according to the invention. As shown in FIG. 14, after executing steps (B1) and (B2), the available touch point range is obtained by the self-capacitance sensing, and then the available touch points are obtained by the mutual-capacitance sensing. This is done by using several times of the self-capacitance sensing to detect all positions of the possible touch points (including ghost points), using the mutual-capacitance sensing to detect the touch panel, and comparing the results to find the data that is not affected by noises. Namely, the obtained touch point range and the possible touch points are compared, where the touch point range indicates a possible touch point range on a sensing axis, a driving axis, or both axes, and the possible touch points indicate sense points sensed by a finger or touch medium, noise signal, or noise point caused by other factors. In this embodiment, the touch points can be searched in the possible touch point range. Conversely, a corresponding possible touch range can be derived from touch points. As shown in FIG. 14, the possible touch point range conjunction is {(D7, S4), (D7, S5), (D8, S4), (D8, S5), (D8, S6)}.

Figure 15:
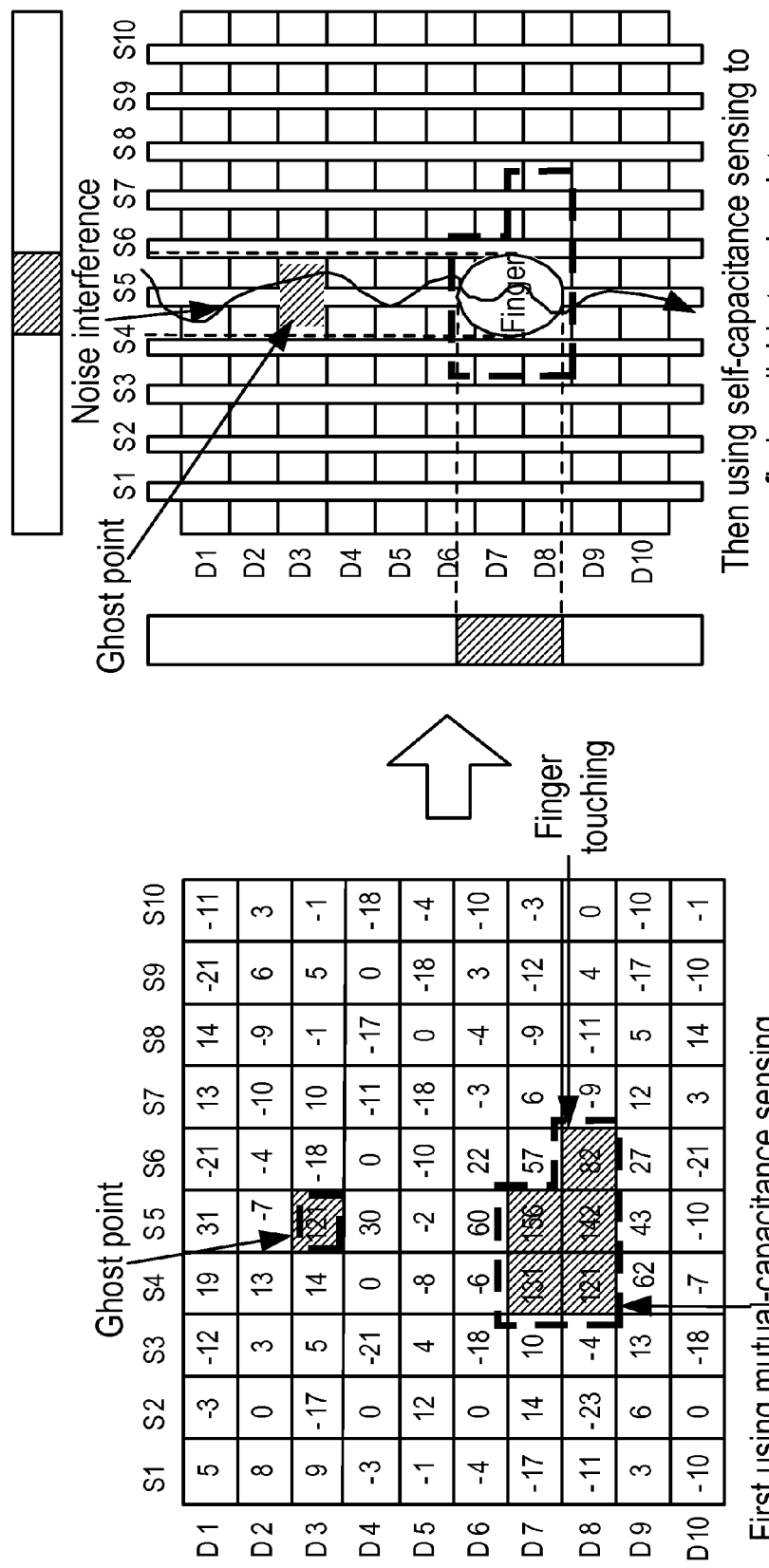
FIG. 15 is a schematic diagram of generating another possible touch point range conjunction according to the invention.

FIG. 15 is a schematic diagram of generating another possible touch point range conjunction according to the invention, which uses the mutual-capacitance sensing to find an available touch point range first and then uses the self-capacitance sensing to find available touch points.

Step (E) outputs the coordinates of the touch points.

When there is no range conjunction between the second possible touch point range and the first possible touch point range in step (C), the process returns to step (B).

Figure 16:
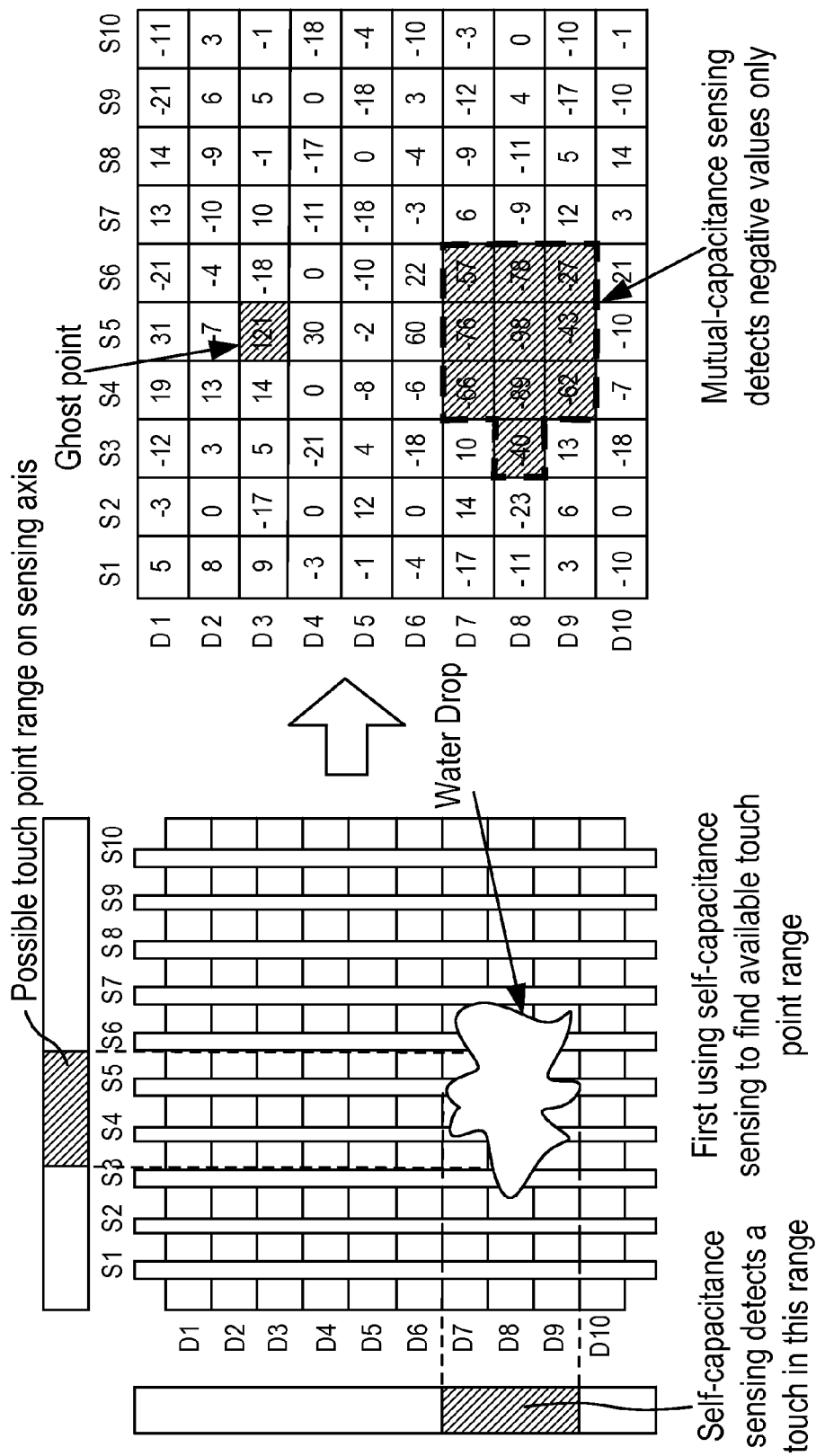
FIG. 16 is a schematic diagram of an application according to the invention.

FIG. 16 is a schematic diagram of an application according to the invention. When there is a water drop on the capacitive touch panel 110, the mutual-capacitance sensing can detect negative values only but not effectively determining the coordinates of the touch points. However, for the self-capacitance sensing, the water drop has the same touch reaction as a finger and thus can be detected by the inventive method for subsequent processing.

In other embodiments, steps (B1) and (B2) can be exchanged in execution, i.e., step (B2) is executed first and then step (B1) is executed, which can have the same result.

In view of the foregoing, it is known that, when the mutual-capacitance sensing is used only, many noise points are generated even the original touch points disappear. Thus, the invention concurrently uses the self-capacitance sensing and the mutual-capacitance sensing to compare the coordinate data. Namely, the self-capacitance sensing is used first to detect the positions of possible touch points (including ghost points), then the mutual-capacitance sensing is used to detect the touch panel, and finally the data resulted from both sensing is compared to find the range conjunction in order to determine the data that is not affected by the noises so as to output the corresponding real coordinates. Such a method can reduce the filter circuit in use and design, so as to obtain an accurate and steady coordinate output with fewer system resources.

The inventive method utilizes the feature that the driving or sensing lines are not easily affected by noise interference in the self-capacitance sensing. The self-capacitance sensing is first used to mark down the possible touch occurrence range and then the mutual-capacitance sensing is used to accurately find the touch points, so as to achieve the effect of filtering out the noises.

Although the present invention has been explained in relation to its preferred embodiment, it is to be understood that many other possible modifications and variations can be made without departing from the spirit and scope of the invention as hereinafter claimed.

What is claimed is:

1. A sensing method using self-capacitance and mutual-capacitance alternatively to reduce touch noises in a capacitive multi-touch system including a capacitive touch panel, a first driving and sensing device, a second driving and sensing device, and a control device, wherein the first driving and sensing device and the second driving and sensing device respectively has a first work mode and a second work mode, and the first driving and sensing device and the second driving and sensing device perform a self-capacitance sensing at the first work mode and perform a mutual-capacitance sensing at the second work mode, the sensing method comprising the steps of:
(A) initializing the first driving and sensing device and the second driving and sensing device by the control device;
(B) configuring the first driving and sensing device and the second driving and sensing device as the first work mode or the second work mode to alternatively perform the self-capacitance sensing and the mutual-capacitance sensing on the capacitive touch panel for finding a first possible touch point range or a second possible touch point range, wherein, in step (B), the control device configures the first driving and sensing device and the second driving and sensing device as the first work mode to perform at least one self-capacitance sensing on the capacitive touch panel for producing a self-capacitance image raw data, and the control device configures the first driving and sensing device and the second driving and sensing device as the second work mode to perform at least one mutual-capacitance sensing on the capacitive touch panel for producing a mutual-capacitance image raw data;
(C) determining whether there is a range conjunction between the first possible touch point range and the second possible touch point range; and
(D) producing a possible touch point range conjunction when there is the range conjunction, and calculating coordinates of touch points based on the possible touch point range conjunction.

2. The method as claimed in claim 1, wherein when the step (C) determines that there is no range conjunction, the step (B) is performed.

3. The method as claimed in claim 2, further comprising a step of:
(E) outputting the coordinates of touch points.

4. The method as claimed in claim 1, wherein the control device determines whether the self-capacitance image raw data is greater than a first threshold so as to find the first possible touch point range in step (B).

5. The method as claimed in claim 1, wherein, in step (B), the control device determines whether the mutual-capacitance image raw data is greater than a second threshold so as to find the second possible touch point range.

6. The method as claimed in claim 1, wherein the control device configures the first driving and sensing device and the second driving and sensing device as the first work mode to perform the self-capacitance sensing on the capacitive touch panel for producing the first possible touch point range, and configures the first driving and sensing device and the second driving and sensing device as the second work mode to perform the mutual-capacitance sensing on the capacitive touch panel for producing the second possible touch point range in step (B).

7. The method as claimed in claim 1, wherein the control device configures the first driving and sensing device and the second driving and sensing device as the second work mode to perform the mutual-capacitance sensing on the capacitive touch panel for producing the first possible touch point range, and configures the first driving and sensing device and the second driving and sensing device as the first work mode to perform the self-capacitance sensing on the capacitive touch panel for producing the second possible touch point range in step (B).

8. The method as claimed in claim 4, wherein the capacitive touch panel has m first conductor lines distributed in a first direction and n second conductor lines distributed in a second direction, and the self-capacitance image raw data has an amount of m+n records, where m and n are each an integer greater than one.

9. The method as claimed in claim 5, wherein the capacitive touch panel has m first conductor lines distributed in a first direction and n second conductor lines distributed in a second direction, and the mutual-capacitance image raw data has an amount of m*n records, where m and n are each an integer greater than one.

10. The method as claimed in claim 2, wherein step (C) further calculates distance between each element of the first possible touch point range and each element of the second possible touch point range so as to produce the possible touch point range conjunction.

11. The method as claimed in claim 10, wherein step (C) sequentially calculates distance between each element of the first possible touch point range and each element of the second possible touch point range, and determines that the element of the first possible touch point range is an element of the possible touch point range conjunction when there is the distance calculated to be zero.

12. The method as claimed in claim 11, wherein step (C) determines that each element of the first possible touch point range is not an element of the possible touch point range conjunction when there is no distance calculated to be zero.

* * * * *